Aug. 28, 1923.　　　　　　　　　　　　　　　　　　　　1,466,473
M. FEDER
BAKING OVEN
Filed March 5, 1920
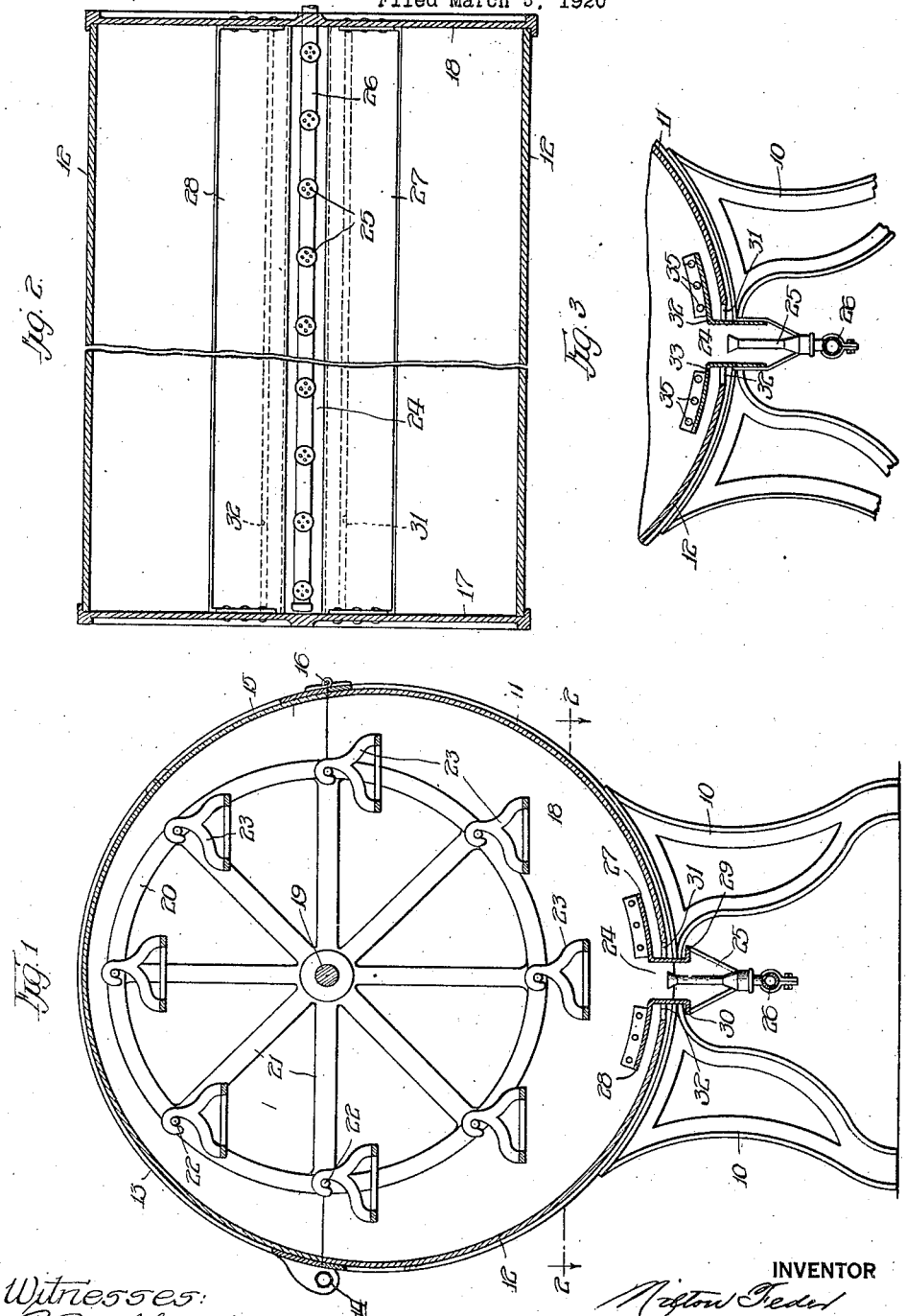

Patented Aug. 28, 1923.

1,466,473

UNITED STATES PATENT OFFICE.

MILTON FEDER, OF OAKLAND, CALIFORNIA, ASSIGNOR TO FEDERAL SYSTEM OF BAKERIES OF AMERICA, INC., OF DAVENPORT, IOWA, A CORPORATION OF DELAWARE.

BAKING OVEN.

Application filed March 5, 1920. Serial No. 363,627.

*To all whom it may concern:*

Be it known that I, MILTON FEDER, a citizen of the United States, residing at Oakland, in the county of Alameda and State of California, have invented certain new and useful Improvements in Baking Ovens, of which the following is a specification.

My invention relates to improvements in baking ovens and particularly of the type having a cylindrical shell wherein a revolving reel carrying shelves upon which the pans are carried and has particular reference to an oven having baffle plates in the lower portions thereof which serve to carry outward and downward through a longitudinally extending opening in the oven shell, the heat used in baking the bread.

In bread baking ovens of this class some means must be provided for the escape of the products of combustion from the oven and it is one of the objects of my invention to provide means for directing these products of combustion outward and downward through an opening in the lower portion of the oven shell, and furthermore, to assist and direct the heat outward and downward through this opening in the bottom of the oven shell.

Another and further object of my invention is the provision of a cylindrical oven shell in which the heat used in baking bread is caused to circulate properly throughout the oven shell in order that the best results are attained in the baking operation.

These and other objects of my invention will be more readily and better understood by reference to the accompanying drawings, and in which—

Figure 1 is a vertical sectional view through the oven shell showing my improved invention;

Figure 2 is a sectional plan view on lines 2—2 of Figure 1; and

Figure 3 is a small sectional view showing a modified form of my invention.

Referring now specifically to the drawings, and in which like reference characters refer to like parts throughout, frame members 10 are shown upon which the lower portion of the oven shell which comprises two sections, 11 and 12 respectively, an upper section 13 is secured to the section 12 by means of a hinge 14; and is provided with a door 15 which is secured to the lower section 11 by means of a hinge 16 which provides means for access to the oven. End members 17 and 18 respectively are provided to which the members 11 and 12 are secured, corresponding end members (not shown) being provided for the member 13. Mounted within the end members 17 and 18 is a shaft 19 to which a reel 20 is secured, the said reel including a plurality of spider members 21, 21. Pins 22 are provided which are secured to the reel 20 and upon which shelves 23, 23 are hung which are adapted to support the bread pans placed in the oven. Extending longitudinally of the oven shell and between the sections 11 and 12 is an opening 24 within which gas burners 25 are positioned, the said gas burners being set upon a gas supply pipe 26. Secured to the end members 17 and 18 in any approved manner is a pair of baffle plates 27, 28 respectively, the said plates being curved slightly and bent downward so as to extend through the opening 24 and are spaced apart from the lower edges of the sections 11 and 12 respectively, and have their lower edges 29 and 30 respectively, bent outwardly. The baffle plates 27 and 28 are spaced from the edges of the members 11 and 12, thus leaving openings 31 and 32 through which the heat from the oven escapes.

Referring now specifically to Figure 3, wherein a modified form of my invention is shown, a pair of baffle plates 33 and 34 are shown which are secured to the end walls 17 and 18 in any approved manner, as by rivets 35, 35, the said baffle plates 33 and 34 being bent downwardly extending through the opening 24 and being spaced apart from the edges of the members 11 and 12, leaving openings 31 and 32 respectively, through which the heat from the oven passes downwardly.

In the operation of the device it will be understood that the products of combustion pass upward from the burners 25 into the oven and strike against the upper wall where it is reflected and thereupon passes to each side of the oven downward along the sides of the oven shell and passes outward under the baffles 27 and 28, downward through the openings 31 and 32 and is deflected by the outwardly turned edges 29 and 30 of the baffle plates 27 and 28. In the modified form the baffle plate does not have these outwardly turned edges, but the products of combustion are directed downwardly through the openings 31 and 32.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination with a cylindrical oven shell having a longitudinal opening in the bottom thereof, burners for supplying heat to said oven and positioned below said longitudinal oven, a pair of spaced baffle plates extending downwardly through said opening on each side of said gas burners, said baffle plates having their lower edges turned outwardly and spaced apart from the edge of the oven shell adjacent said longitudinal opening.

2. In combination with a cylindrical oven shell having a longitudinally extending opening in the bottom thereof, of burners centrally positioned in said opening, a plurality of baffle plates secured to said oven shell and extending downward through the said opening and spaced apart from the marginal edges thereof, the upper portions of said baffles being turned and extending parallel with the walls of the oven shell and spaced apart therefrom.

3. In combination with a cylindrical oven shell having a longitudinally extending opening in the bottom thereof, of burners centrally positioned in said opening and a plurality of baffle plates secured to said oven shell at each of their ends and extending through said opening and spaced apart from the marginal edges thereof, the upper portions of said baffles being turned and extending parallel with the walls of said oven shell and spaced apart therefrom.

Signed at Chicago, Illinois, this 21st day of February, 1920.

MILTON FEDER.